March 12, 1935. S. H. CALDWELL 1,993,733
LUBRICATION
Filed Dec. 22, 1923 2 Sheets-Sheet 1
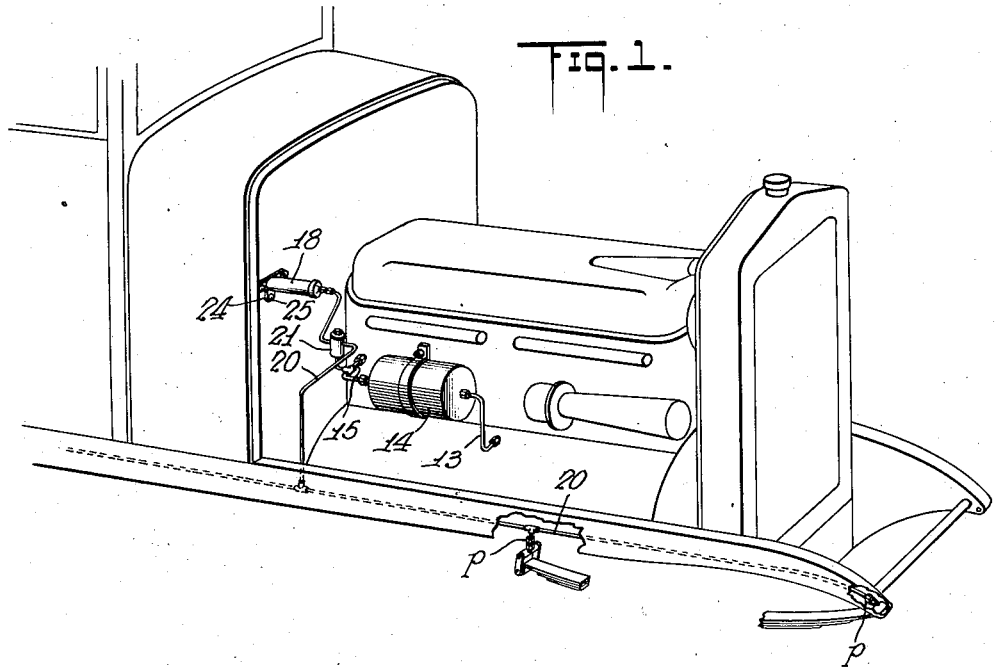
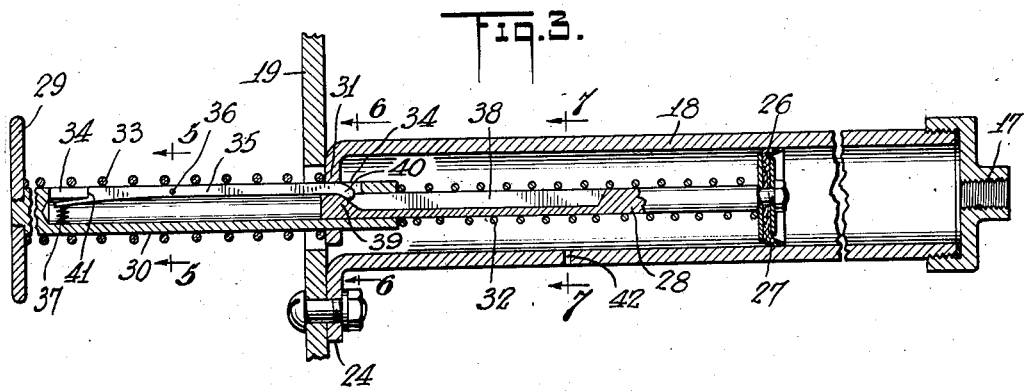
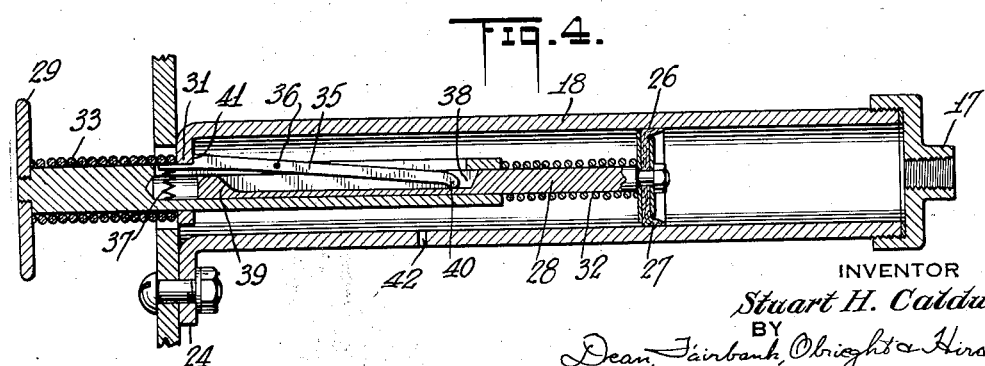
INVENTOR
Stuart H. Caldwell
BY
Dean, Fairbank, Obright & Hirsch.
his ATTORNEYS.

March 12, 1935.　　S. H. CALDWELL　　1,993,733
LUBRICATION
Filed Dec. 22, 1923　　2 Sheets-Sheet 2
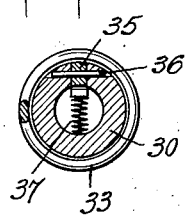
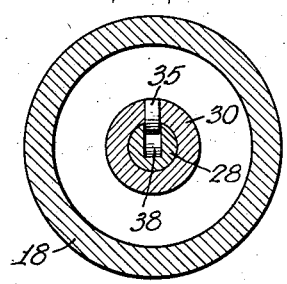
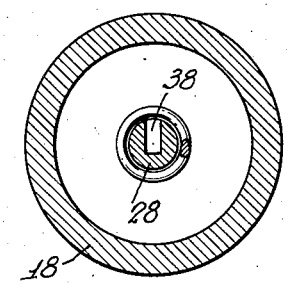
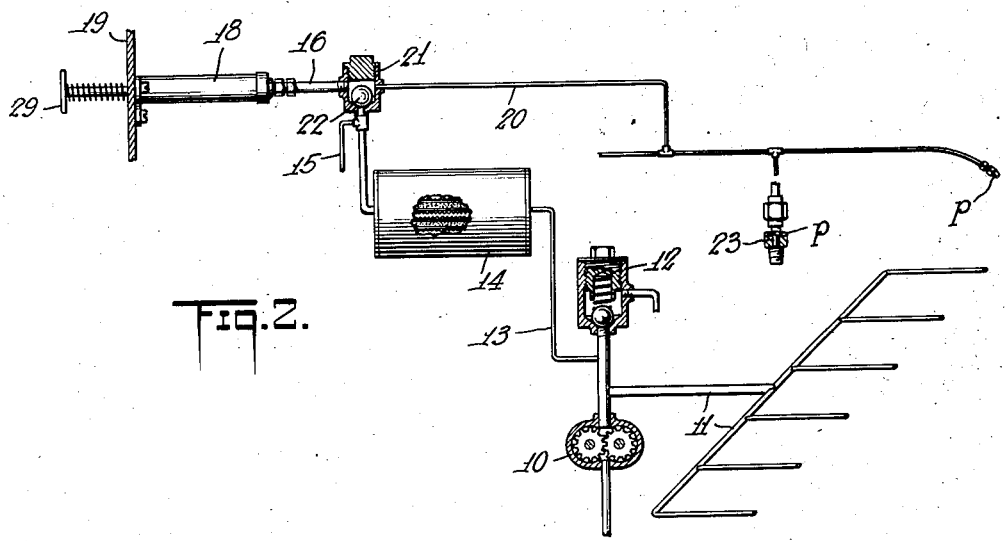
INVENTOR
Stuart H. Caldwell
BY
Dean, Fairbank, Obright & Hirsch
his ATTORNEYS.

Patented Mar. 12, 1935

1,993,733

UNITED STATES PATENT OFFICE 1,993,733

LUBRICATION

Stuart H. Caldwell, Detroit, Mich., assignor to Auto Research Corporation, a corporation of Delaware Application December 22, 1928, Serial No. 327,784

16 Claims. (Cl. 184—7)

The present invention is primarily concerned with centralized lubricating systems, such as centralized chassis lubricating systems, and it is particularly directed to a novel pump construction.

Although the present invention will be specifically described in connection with an automobile lubricating system, in which the lubricant is fed to the pump from the engine oil reservoir or from the engine oil pump, preferably through a filtering device, it is to be understood that the invention has broad application to centralized distribution systems.

Among the objects of the invention are to provide lubricant propulsive and control means of simple, inobtrusive and inexpensive construction which lends itself readily for use with distributing systems, such as described and claimed in the prior patent to Joseph Bijur, No. 1,632,771 of June 14, 1927.

Another object is to provide a system of the above type, the operation of which requires no selective manipulation, the maintenance of which requires a minimum of attention and in which no serious loss of oil from the lubricant supply can occur should there be a leak in the distributing piping.

Another object is to provide a system of the above type which need not be specially primed for operation, but which always maintains available a charge of lubricant in readiness to be propelled into the distributing system when required, without the need first to withdraw the lubricant from the source of supply.

It is a feature of the invention to segregate a charge of filtered oil from the lubricant supply and to apply sustained pressure thereto for propulsion to the bearings.

Another feature is automatically to exert suction after each effective lubrication for segregating a fresh supply of filtered oil preparatory to the next operation.

When the invention of the present application is utilized in connection with engine oil pump supply, the engine filter may be connected in parallel with the main output of the engine oil pump and the lubricant supply for the chassis may be taken, not from the partially cleansed oil in the engine crank case but immediately from the outlet of the engine filter.

The oil is shown segregated in the cylinder of a pump having a discharge spring to expel oil into a distributing pipe system, said pump also having a charging spring and latch means automatically released by completion of the pump discharge to release the charging spring, both springs being simultaneously stressed by a single manual operation.

In the accompanying drawings in which is shown one of various possible embodiments of the several features of the invention, Fig. 1 is a fragmentary perspective view of an automobile, indicating a preferred installation, Fig. 2 is a diagrammatic view of the supply system.

Fig. 3 is a view on a larger scale in longitudinal cross-section showing a preferred form of pump in discharged state.

Fig. 4 is a view similar to Fig. 3 showing the pump charged, and

Figs. 5, 6 and 7 are cross-sectional views respectively on line 5—5, 6—6 and 7—7 of Fig. 3.

Referring now to Figs. 1 and 2 of the drawings, the usual gear pump 10 of the engine oiling system (Fig. 2) discharges through conduits 11 to the various engine bearings and has a pressure relief outlet valve 12. In parallel with said valve is a conduit 13 leading to an oil filter 14 of any usual construction, mounted at the exterior of the engine and draining through an outlet pipe 15 back into the engine crank case. Tapped into the outlet pipe 15 is a pipe line 16 delivering to the inlet end 17 of the chassis supply element 18 which is preferably affixed at the dashboard 19.

The supply element 18 delivers to the distributing system 20 through an outlet fitting 21 which preferably has a light check valve 22 to block return flow to the filter outlet. The distributing system is preferably of the general type disclosed in the prior patent to Joseph Bijur above identified in which highly restricted fixed outlets lead in parallel to the various bearings. I have illustratively shown in Fig. 2 on a larger scale, a fragment of one of said outlets embodied as a drip plug $p$ having a restriction pin 23 in a corresponding bore.

The chassis supply element is a lubricant container shown as a pump cylinder or shell 18 having lateral ears or lugs 24 affording a flange mount bolted at 25 against the forward side of the dashboard. The pump comprises a piston 26 preferably with the usual leather cups 27 which has a stem 28 protruding therefrom toward the dashboard. An operating knob 29 has a sleeve 30 rigid therewith which encircles the end of the stem 28 and has a slide fit in the inturned lug 31 at the flange-mount head of the cylinder. A coil discharge spring 32 encircles the stem and reacts at one end against the piston 26 and at the other against the inner extremity of the operating sleeve 30. A charging coil spring 33 encircles the sleeve and bears at one end against lug 31 and at the other against the operating knob 29. This sleeve 30 is longitudinally slotted at 34 to accommodate a longitudinal latch member 35 pivoted on a cross pin 36, and urged to outermost position by means of a small coil spring 37 in the bore of the sleeve and reacting against the outer extremity of the latch. The slide bearing lug 31 as shown in Fig. 3 normally maintains latch 35 flush with the surface of sleeve 30. The stem 28 is longitudinally grooved at 38 to afford a latch tripping cam 39 near the outer extremity thereof, which, in the normal distended position of the parts shown in Fig. 3 engages the inturned tail 40 of the latch to prevent withdrawal of the sleeve 30 from the assembly.

Assuming the parts to be in the position shown in Fig. 3 in which the pipe system up to the drip plug outlets is completely filled with oil, as is also the cylinder shell 18 beyond the piston 26, the user merely pushes against the knob 29 to force it inward to the limit of its stroke. In this operation, knob 29 compresses spring 33 and the end of sleeve 30 compresses spring 32, without, however, materially moving piston 26 since the latter is restrained by the incompressible oil filling the passages leading to the relatively high-resistance drip plug outlets. During this energizing stroke, the latch 35 slides along the upper part of the slide bearing in lug 31 until latch shoulder 41 passes said bearing, whereupon the expansion of spring 37 latches said shoulder behind the lug as shown in Fig. 4.

Under the sustained pressure exerted by spring 32 the piston 26 slowly moves outward to discharge the pump against the resistance imposed by the drip plug outlets. As the plunger approaches the end of its discharge stroke, the cam 39 reaches the tail 40 of latch 35 and pushes the latter outward, thereby drawing the latch shoulder 41 inward past the lug 31 of the cylinder, and thus releasing the stressed spring 33 which now expands to return the sleeve 30, and by the coaction of tail 40 with cam 39 draws along the stem 28, the now expanded spring 32 and the plunger 26, thereby restoring the parts to the position shown in Fig. 3. In this restoring action, the plunger 26, of course, exerts suction and draws a fresh charge of lubricant from the outlet of the engine filter 14 which charge remains in the pump in readiness for the next discharge. The outlet of the pipe passage 15 is restricted or of small bore as shown to assist the pump withdrawing oil.

Inasmuch as the cylinder 18 is at level well above that of the engine crank case, there is no danger of the engine being robbed of oil due to any breakage or leak in the chassis lubricating system, especially as little or none of the pressure generated in the engine pump 10 exists at the outlet of the engine filter. Preferably the system is operated by exerting the push against knob 29 when the vehicle is about to start for a day's use. The pump will thus complete its discharge during operation of the vehicle even though the oil be highly viscous as in winter and the pump piston take an hour or more to settle. The suction stroke will accordingly be exerted while the engine is running and there will thus be a supply at the filter outlet 15 upon which the pump draws.

A drain hole 42 in shell 18 between the piston 26 and the dashboard, permits escape of any oil leaking by the piston 26, and thereby prevents escape of oil into the driver's compartment.

In operation it will be seen that the pump charge is automatically performed by the expansion of spring 33 and the pump discharge by spring 32. The only manipulation required to set the system into operation is initially to stress both spring 33 and spring 32 by a push on the plunger 29 and with a pump of corresponding volume this may be performed say once a day.

I claim:

1. In a lubricating system, the combination of a lubricant pump, having an outlet at one end thereof, a piston therein having a plunger, an operating sleeve encircling said plunger and protruding beyond said cylinder, a pump discharging spring encircling said plunger and reacting against the end of said operating sleeve, a charging spring encircling said operating sleeve and reacting against a part fixed with said pump cylinder, a latch member carried by said sleeve and adapted to be restrained against the end of said cylinder upon depression of said sleeve, and tripping means on said plunger stem for releasing said latch when the plunger reaches substantially discharged position.

2. A chassis lubricating system of the spring-seated drip plug type, means for supplying the latter from the engine oiling system, said means including a single cylinder pump in communication with the head of said distributing system, an engine oil filter having one outlet draining to the engine oil pan and another outlet communicating with said pump cylinder and exerting pressure at said pump cylinder insufficient to open the valves of said drip plugs, and means for occasionally applying sustained energy to discharge the contents of said normally charged pump into the distributing system.

3. In a motor vehicle, a lubricating installation comprising an engine oil system including an engine oil pump, an engine oil cleaner, a chassis lubricating system of the drip plug type, a chassis lubricating pump at the head of said distributing system and in open communication therewith, said engine oil cleaner being in normal communication with said pump, said engine oil cleaner having an outlet draining cleaned oil to the crank case, said outlet affording sufficient resistance to facilitate charging of said chassis lubricating pump.

4. In a central lubricating installation of the type comprising a branched distribution system with proportioning outlets leading to a plurality of bearings, and a central reservoir; a central pump for metering the total quantity of lubricant to said outlets, said pump receiving lubricant from said reservoir and supplying it to said system, and having a piston, a cylinder and an actuator, said piston and said actuator being adapted to take forward and return strokes, and a resilient connection between said piston and said actuator causing forward movement of the piston upon forward movement of the actuator but at a decreased rate and at a longer time interval, means to automatically return the actuator upon completion of the discharge stroke or forward movement of the piston, and means to automatically return the piston and charge the pump during the return of the actuator, said actuator being directly connected to said piston during said return stroke of said piston.

5. In a central lubricating installation of the type comprising a branched distribution system with proportioning outlets leading to a plurality of bearings, and a central reservoir; a central pump for metering the total quantity of lubricant to said outlets, said pump receiving lubricant from said reservoir and supplying it to said system, and having a piston, a cylinder and an actuator, and means actuated upon a forward stroke of said actuator automatically to cause in sequence subsequent to said forward stroke; a forward stroke of the piston to discharge the pump, a return stroke of the actuator and a return stroke of the piston during the return stroke of the actuator, said return stroke of the piston serving to charge the pump whereby preparation is made for the next forward stroke of the actuator, said actuator being directly connected to said piston during said return stroke of said piston.

6. In a central lubricating installation of the type comprising a branched distribution system with proportioning outlets leading to a plurality of bearings, and a central reservoir; a central pump for metering the total quantity of lubricant to said outlets, said pump receiving lubricant from said reservoir and supplying it to said system; and having a piston, a cylinder and an actuator, and resilient means actuated upon a forward stroke of said actuator automatically to cause in sequence subsequent to said forward stroke a forward stroke of the piston to discharge the pump, a return stroke of the actuator and a return stroke of the piston during the return stroke of the actuator, said return stroke of the piston serving to charge the pump whereby preparation is made for the next forward stroke of the actuator, said actuator being directly connected to said piston during said return stroke of said piston.

7. In a central lubricating installation of the type comprising a branched distribution system with proportioning outlets leading to a plurality of bearings, and a central reservoir; a central pump for metering the total quantity of lubricant to said outlets, said pump receiving lubricant from said reservoir and supplying it to said system, and having a piston, a cylinder and an actuator, and two resilient means simultaneously stressed upon a forward stroke of said actuator, one resilient means to cause a forward discharge stroke of the piston upon expansion and the other subsequent to the expansion of said first means upon its expansion in turn to cause a reverse stroke of the actuator and a reverse stroke of the piston during the reverse stroke of the actuator.

8. In a lubricating system, a manually energized pump having an actuator, a cylinder, a cylinder carrying structure, a piston, a charging spring reacting against and between the structure and the actuator stressed by said actuator and when released actuating said piston in a charging direction, a discharging spring reacting against and between the actuator and the piston stressed by said actuator and causing discharging movement of said piston, said pump having interlock means for locking said charging spring in stressed condition when stressed by said actuator and for automatically releasing the charging spring upon completion of the discharge.

9. In a lubricating system, a pump having an actuator, a cylinder, a cylinder carrying structure, a piston, said cylinder having an inlet and an outlet, a piston discharge spring, actuator operated means for storing energy in said discharge spring to discharge said piston, means for recharging the pump and means for causing actuation of said recharging means upon substantial completion of the pump discharge, said piston moving with lost motion in respect to said actuator upon discharge and moving rigidly with said actuator upon recharge.

10. In a lubricating system, a pump having a plunger provided with an elongated stem and with spring discharging means and spring charging means, an operating sleeve encircling the stem of said plunger, said sleeve being capable of assuming one position in which it is telescoped over substantially the entire length of the stem of said plunger and a second position in which it is withdrawn substantially its entire length from said stem, said spring charging means tending to maintain said operating sleeve in said second position, latch means carried by the sleeve for locking said operating sleeve in said first position, means associated with said plunger for releasing said latch at the end of the pump discharge stroke, the release of said latch serving to release said spring charging means and to cause a return stroke.

11. In a lubricating installation for a motor vehicle of the type comprising an engine oiling system, and a chassis oiling installation; a pump with a discharge element at the inlet of the chassis oiling installation, means establishing communication between said engine oiling system and said pump, a plurality of resilient means, one for operating said discharge element to discharge the contents of the pump into said installation and another to operate the discharge element to charge the pump from said engine oiling system, manually controlled means moved in one direction for energizing both said resilient means, said first resilient means upon actuation by forward movement of said manually controlled means operating said discharge element to discharge the pump, and said second resilient means serving to return said controlled means and said discharge element after said first resilient means has discharged said pump and has become de-energized.

12. In a central lubricating installation of the type comprising a branched distribution system with proportioning outlets leading to a plurality of bearings, a central reservoir and a central pump for metering the total quantity of lubricant to said outlets, said pump receiving lubricant from said reservoir and supplying it to said system and having a piston, a cylinder and an actuator, and two resilient means simultaneously stressed upon a forward stroke of said actuator, one resilient means to cause a forward discharge stroke of the piston upon expansion and the other subsequent to the expansion of said first means upon its expansion in turn to cause a reverse stroke of the piston, one of said resilient means also solely causing a reverse stroke of said actuator.

13. In a central lubricating installation of the type comprising a branched distribution system with proportioning outlets leading to a plurality of bearings, a central reservoir and a central pump for metering the total quantity of lubricant to said outlets, said pump receiving lubricant from said reservoir, and supplying it to said system, and having a piston, a cylinder and an actuator, and two resilient means simultaneously stressed upon a forward stroke of said actuator, one resilient means to cause a forward discharge stroke of the piston upon expansion and the other subsequent to the expansion of said first means upon its expansion in turn to cause a reverse stroke of the piston, said resilient means also causing a reverse stroke of said actuator, and both of said resilient means being positioned on one side of said piston.

14. In a central lubricating installation of the type comprising a branched distribution system with proportioning outlets leading to a plurality of bearings, a central reservoir and a central pump for metering the total quantity of lubricant to said outlets, said pump receiving lubricant from said reservoir and supplying it to said system and having a piston, a cylinder and an actuator, and two resilient means simultaneously stressed upon a forward stroke of said actuator, one resilient means to cause a forward discharge stroke of the piston upon expansion and the other subsequent to the expansion of said first means upon its expansion in turn to cause a reverse stroke of the piston, one of said resilient means also solely causing a reverse stroke of said actuator, only one of said resilient means exerting a pressure on said piston.

15. In a central lubricating installation of the type comprising a branched distribution system with proportioning outlets leading to a plurality of bearings, a central reservoir and a central pump for metering the total quantity of lubricant to said outlets, said pump receiving lubricant from said reservoir and supplying it to said system and having a piston, a cylinder and an actuator, and two resilient means simultaneously stressed upon a forward stroke of said actuator, one resilient means to cause a forward discharge stroke of the piston upon expansion and the other subsequent to the expansion of said first means upon its expansion in turn to cause a reverse stroke of the piston, one of said resilient means also solely causing a reverse stroke of said actuator, the first resilient means being of substantially greater strength than the second resilient means.

16. In a central lubricating installation of the type comprising a branched distribution system with proportioning outlets leading to a plurality of bearings, a central reservoir and a central pump for metering the total quantity of lubricant to said outlets, said pump receiving lubricant from said reservoir and supplying it to said system and having a piston, a cylinder and an actuator, and two resilient means simultaneously stressed upon a forward stroke of said actuator, one resilient means to cause a forward discharge stroke of the piston upon expansion and the other subsequent to the expansion of said first means upon its expansion in turn to cause a reverse stroke of the piston, one of said resilient means also solely causing a reverse stroke of said actuator, both said resilient means contacting with and being directly compressed by said actuator.

STUART H. CALDWELL.